(12) United States Patent
Kim et al.

(10) Patent No.: US 8,959,701 B2
(45) Date of Patent: Feb. 24, 2015

(54) MULTI-ADAPTER FOR A VEHICLE WIPER

(75) Inventors: Tae Hun Kim, Dalseong-gun Daegu (KR); Kyoung Joon Song, Dalseong-gun Daegu (KR)

(73) Assignee: Cap Corporation, Daegu (KR)

( * ) Notice: Subject to any disclaimer, the term of this patent is extended or adjusted under 35 U.S.C. 154(b) by 7 days.

(21) Appl. No.: 13/498,872

(22) PCT Filed: Sep. 28, 2010

(86) PCT No.: PCT/KR2010/006589
§ 371 (c)(1),
(2), (4) Date: Mar. 28, 2012

(87) PCT Pub. No.: WO2011/040743
PCT Pub. Date: Apr. 7, 2011

(65) Prior Publication Data
US 2012/0180244 A1   Jul. 19, 2012

(30) Foreign Application Priority Data

Sep. 29, 2009   (KR) .................. 10-2009-0092518
Sep. 29, 2009   (KR) .................. 10-2009-0092519

(51) Int. Cl.
*B60S 1/40*   (2006.01)
*B60S 1/38*   (2006.01)

(52) U.S. Cl.
CPC .......... *B60S 1/387* (2013.01); *B60S 2001/4054* (2013.01); *B60S 2001/4058* (2013.01); *B60S 1/4048* (2013.01); *B60S 1/3881* (2013.01); *B60S 2001/4051* (2013.01)
USPC ................................ 15/250.32; 15/250.351

(58) Field of Classification Search
CPC .... B60S 1/4038; B60S 1/4045; B60S 1/4048; B60S 1/4064; B60S 1/3851

USPC ............. 15/250.31, 250.32, 250.43, 250.44, 15/250.201, 250.351
See application file for complete search history.

(56) References Cited

U.S. PATENT DOCUMENTS

| 2,031,297    A  * | 2/1936 | Anderson ................. 15/250.32 |
| 2005/0177970 A1 * | 8/2005 | Scholl et al. ............. 15/250.32 |

(Continued)

FOREIGN PATENT DOCUMENTS

| EP | 1849666    * | 10/2007 |
| EP | 1849666 A1   | 10/2007 |

(Continued)

OTHER PUBLICATIONS

International Search Report for PCT/KR2010/006589, English translation attached to original, Both completed by the Korean Patent Office on Jun. 28, 2011, All together 5 Pages.

*Primary Examiner* — Gary Graham
(74) *Attorney, Agent, or Firm* — Revolution IP, PLLC

(57) ABSTRACT

A multi-adaptor for a vehicle wiper, which interconnects an arm and a blade for wiping window glass, wherein both side walls of the arm have stopper pieces and a free end, wherein a selective hook protrudes from the free end. The multi-adaptor for a vehicle wiper includes: a main body, a coupling portion formed at one end of the main body so as to enable the free end of the arm to be coupled thereto, and support portions formed at both side walls of the other end of the main body to support the stopper pieces of the arm. Accordingly, the multi-adaptor significantly increases arm-coupling force as compared to conventional adaptors, and thus preemptively prevents the arm from being separated from the adaptor.

4 Claims, 6 Drawing Sheets

(56) References Cited

U.S. PATENT DOCUMENTS

| | | | |
|---|---|---|---|
| 2006/0218740 A1* | 10/2006 | Coughlin | 15/250.32 |
| 2007/0226940 A1 | 10/2007 | Thienard | |
| 2009/0307862 A1* | 12/2009 | Boland | 15/250.32 |
| 2010/0205763 A1* | 8/2010 | Ku | 15/250.32 |

FOREIGN PATENT DOCUMENTS

| | | |
|---|---|---|
| JP | 2005-520736 A | 7/2005 |
| JP | 2006-507991 A | 3/2006 |
| JP | 2006-525903 A | 11/2006 |
| JP | 2000-210552 A | 9/2008 |
| KR | 1020050007446 A | 1/2005 |
| KR | 100692369 B1 | 3/2007 |
| KR | 1020080099013 A | 11/2008 |
| KR | 1020080108360 A | 12/2008 |
| KR | 1020090100975 A | 9/2009 |
| KR | 1020090115144 A | 11/2009 |
| WO | 2006106006 A1 | 10/2006 |
| WO | 2008101561 A1 | 8/2008 |

\* cited by examiner

US 8,959,701 B2

MULTI-ADAPTER FOR A VEHICLE WIPER

CROSS-REFERENCE TO RELATED APPLICATION

This application is the U.S. national phase of PCT Appln. No. PCT/KR2010/006589 filed on Sep. 28, 2010, which claims priority to KR application 10-2009-0092519 filed on Sep. 29, 2009 and KR application 10-2009-0092518 filed on Sep. 29, 2009, the disclosures of which are incorporated in their entirety by reference herein.

FIELD OF THE INVENTION

The present invention relates to a multi-adaptor for a vehicle wiper, more particularly, a multi-adaptor for a vehicle wiper which can drastically increase arm-coupling force as compared to conventional adaptors.

BACKGROUND OF THE INVENTION

In general, in case of automobiles, if a surface of glass window is polluted due to dusts or various foreign matters in the air or weather-related snow or rain, it is difficult to secure the field of vision, thus safe driving is hindered. Therefore, as means for securing the field of vision for safe driving of the driver, a wiper device for vehicle is installed which wipes out snow, rain or foreign matters etc. on the surface of glass window.

A wiper device according to a prior art comprises a blade of a predetermined length made of soft rubber for wiping out snow, rain or polluting matters while moving in close contact with the surface of glass window; a body spring coupled to upper end of the blade and having a predetermined curvature and elastic force; a resting plate coupled to the body spring at center thereof in a longitudinal direction; an adaptor coupled to the resting plate; and a longitudinal arm for delivering rotational power by connecting one end of the arm to a motor installed in the vehicle and detachably connecting the other end to the adaptor.

In this connection, if the arm is not firmly coupled to the adaptor, the arm may depart from the adaptor to thereby cause a car accidence, therefore, various arms and adaptors with increased coupling force have been recently developed, and such techniques are proposed in Korean Patent Publication No. 10-2008-0108360 (hereinafter, "cited reference 1") titled "A Windscreen Wiper Device" and Korean Registration Patent No. 10-0692369 (hereinafter, "cited reference 2") titled "Wiper connection device of wiper arm join a form".

The arm according to the cited reference 1 is formed so as to wrap top portion and both lateral sides of the adaptor and is provided on upper surface of its free end portion with finger parts.

Furthermore, in the adaptor according to the cited reference 1, formed at free end portion of joint member are concave parts coupled with the finger parts of the arm, and protruding parts are formed each extending from longitudinal direction side of the joint member to lateral direction, by which parts protruding parts correspondingly formed on the arm are caught.

However, the adaptor according to the cited reference 1 has a structure wherein the finger parts of the arm are inserted in the concave parts formed on the joint member into close contact therewith and the protruding parts of the arm are supported on the protruding parts formed on side walls of the joint member, whereby the arm is coupled to the adaptor. Since the finger parts of the arm are not hook-coupled to the concave parts of the adaptor, but simply inserted in the concave parts into close contact therewith, there is a concern that the finger parts of the arm coupled to the concave parts of the adaptor can be separated from upper portion of the adaptor due to shock from the outside or centrifugal force resulting from wiping.

Furthermore, the arm according to the cited reference 2 is one of top lock type and is formed so as to wrap the upper portion and both lateral sides of the adaptor, and has assembling holes on upper plate and protruding parts formed on both side walls.

Furthermore, the adaptor according to the cited reference 2 comprises two side plates including elastic members exhibiting elasticity through elongate holes formed in both side walls and having a through hole formed in the center; a front plate including depressed groove in which upper portion of a blade is inserted; depressed part formed so as to be opened at its lower end and provided through a plurality of ribs; and a upper plate having a button formed on its upper portion and coupled to the assembling hole of the arm.

In the case of such an adaptor according to the cited reference 2, the arm is coupled to the adaptor by coupling the button protrudingly formed on the upper plate to the assembling hole of the arm. Namely, the arm is placed so as to cover upper portion of the adaptor in such a way that the protruding part of the arm is brought into close contact with both sides of the adaptor, and thereafter the button of the adaptor is inserted in the assembling hole of the arm, whereby the arm is coupled to the adaptor.

However, since the adaptor according to the cited reference 2 is coupled with the arm only by using the button formed on the upper plate, portion for coupling the arm with the adaptor is not sufficient, the coupling force is weak, and since both sides of the adaptor is formed so as to exhibit elasticity, there is a concern that the arm can be separated from the adaptor due to shock from the outside or centrifugal force resulting from wiping.

Therefore, in order to solve the above-mentioned problems, the applicant has filed an application relating to an adaptor to which an arm with hook is applicable. Such an adaptor is proposed in Korean Registration Patent No. 10-0891195 (hereinafter, "cited reference 3") titled "Automobile wiper-blade". However, the adaptor according to the cited reference 3 should have an auxiliary cap in addition to the adaptor in order to increase a coupling force for coupling the arm with the adaptor, which results in a problem that the structure becomes complicated and production cost is increased and inconvenience of users is caused.

SUMMARY OF THE INVENTION

The present invention has been devised for solving the above-mentioned problems, and its object is to provide a multi-adaptor for a vehicle wiper which can drastically increase the coupling force as compared to the conventional adaptors.

Furthermore, another object of the present invention is to provide a multi-adaptor for a vehicle wiper which can enhance convenience of users and reduce production cost.

For achieving the above-mentioned objects, a multi-adaptor for a vehicle wiper of the present invention for connecting an arm having stopper pieces formed at both side walls and a hook selectively protrudingly formed at a free end portion and a blade for wiping a surface of glass window is characterized in that the multi-adaptor comprises a main body, a coupling portion arranged at one end portion of the main body, to which coupling portion the free end portion of the arm is coupled, and support portions arranged at both side walls of the other end portion of the main body to support the stopper pieces of the arm.

Here, the multi-adaptor of the present invention is characterized in that the coupling portion comprises a hook-coupling portion to which the hook of the arm is coupled.

The multi-adaptor of the present invention is characterized in that the hook-coupling portion comprises an insertion groove in which the hook of the arm is inserted, and a support projection for supporting a tip of the hook inserted through the insertion groove.

Furthermore, the multi-adaptor of the present invention is characterized in that the arm further comprises an auxiliary hook positioned with a distance from the hook, and an auxiliary hook-coupling part coupled with the auxiliary hook is arranged at the other end portion of the main body.

The multi-adaptor of the present invention is characterized in that the auxiliary hook-coupling portion comprises an auxiliary insertion groove in which the auxiliary hook is inserted, and an auxiliary support projection for supporting a tip of the auxiliary hook inserted through the auxiliary insertion groove.

The multi-adaptor of the present invention is characterized in that the coupling portion comprises snap hooks for elastically supporting the free end portion of the arm.

The multi-adaptor of the present invention is characterized in that the support portions further comprise stopper projections by which the stopper pieces of the arm are kept caught.

According to the present invention, the arm-coupling force can be drastically increased as compared to the conventional adaptor, and thus arm can be preemptively prevented from being separated from the adaptor.

DETAILED DESCRIPTION OF EXEMPLARY EMBODIMENTS

Figure 1:
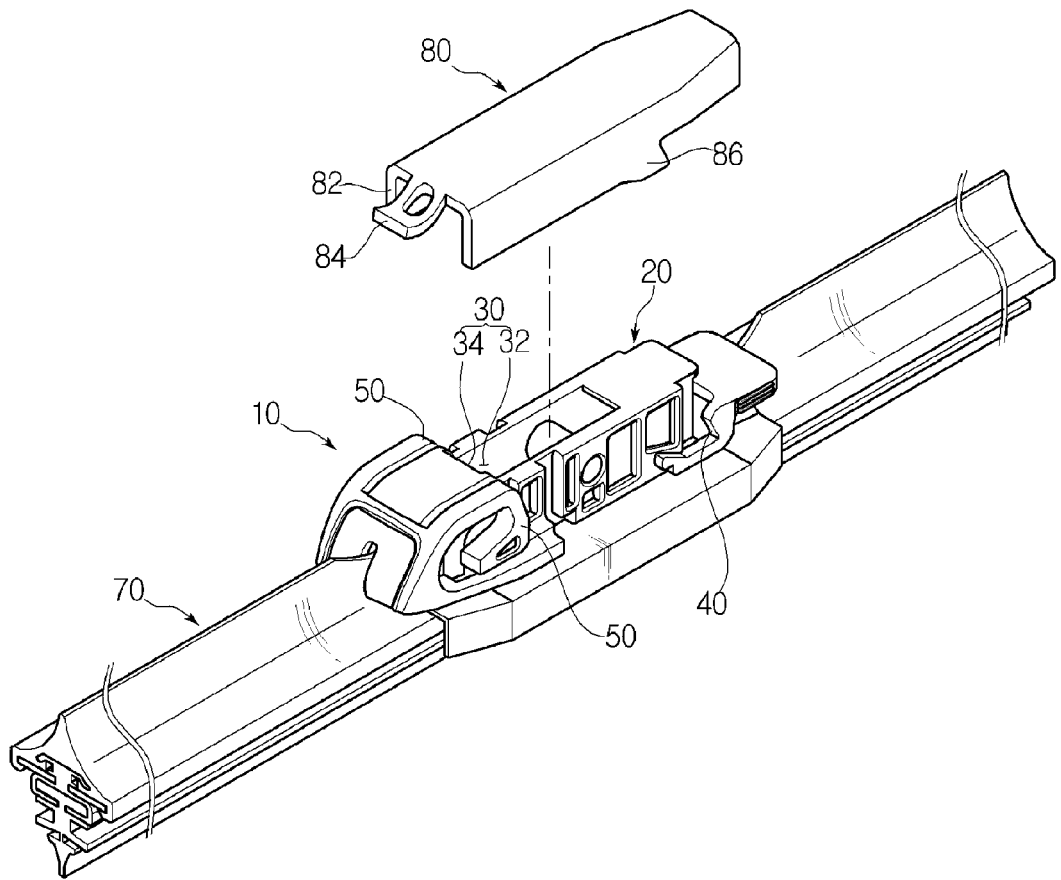
FIG. 1 is a perspective view showing the construction of a multi-adaptor for a vehicle wiper according to a first example of the present invention and an arm having a single hook.

Hereinafter, examples of the present invention will be described in detail, but the present invention is not limited to the following examples as long as its gist is not departed.

Prior to description, in several examples, a first example is representatively described by using the same reference numerals for components having the same construction, and for other examples, description will be given of different construction from that of the first example.

FIG. 1 is a perspective view showing the construction of a multi-adaptor for a vehicle wiper according to the first example of the present invention and an arm having a single hook.

As illustrated in FIG. 1, the multi-adaptor (10) for a vehicle wiper according to the first example of the present invention comprises a main body (20), a coupling portion arranged at one end portion of the main body (20), to which coupling portion a free end portion of the arm (80) is coupled, and support portions (40) arranged at the other end portion of the main body (20) to support stopper pieces (86) of the arm (80).

Here, the arm (80) coupled to the multi-adaptor (10) for a vehicle wiper has a single hook, and the arm (80) is provided with a hook (84) protruding from its free end portion (82), and a pair of stopper pieces (86) are formed at both side walls of the arms (80) while downwardly protruding therefrom.

In the following, description will be given of each construction of the multi-adaptor (10) for a vehicle wiper to which the arm (80) is coupled.

The main body (20) is in the form of case and coupled to a blade (70) for wiping a surface of glass window of the vehicle.

The multi-adaptor (10) according to the first example of the present invention comprises a hook-coupling portion (30) as a coupling portion to which the hook (84) of the arm (80) is coupled. The hook-coupling portion (30) is arranged at one end portion of the main body (20), to which coupling portion the hook (84) of the arm (80) is hook-coupled, and such a hook-coupling portion (30) consists of an insertion groove (32) in which the hook (84) of the arm (80) is inserted, and a support projection (34) for supporting a tip of the hook (84) inserted through the insertion groove (32).

The support portions (40) are arranged at the other end portion of the main body (20) and elastically support the stopper pieces (86) of the arm (80), and provide the arm (80) with elastic force such that the hook (84) of the arm (80) can be supported on the support projection (34) of the hook-coupling portion (30) in close contact therewith.

Namely, the support portions (40) are formed so as to be coupled with the stopper pieces (86) of the arm (80) in a form-fitting manner, and have elasticity such that the support portions (40) can be elastically deformed as its upper portions are pressed, and when the stopper pieces (86) of the arm (80) are coupled to the support portions, the support portions (40) are restored from its elastic deformation and thus provide the arm (80) with the elastic force such that the hook (84) of the arm (80) can be supported on the support projection (34) of the hook-coupling portion (30) in close contact therewith.

Meanwhile, snap hooks (50) can be additionally arranged at the one end portion of the main body (20) as coupling portions coupled with the free end portion (82) of the arm.

Namely, the snap hooks (50) are arranged at both side walls of the one end portion of the main body (20), and when the hook (84) of the arm (80) is supported on the support projection (34) of the hook-coupling portion (30), the snap hooks serve to simultaneously support the free end portion (82) of the arm (80), whereby the arm (80) can be more firmly secured to the adaptor (10).

Figure 2:
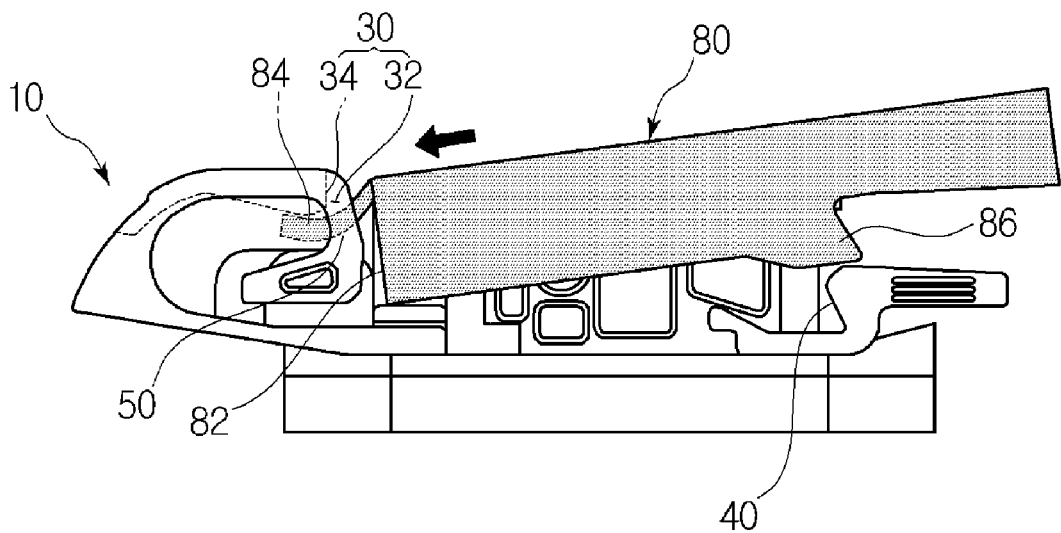
FIGS. 2 to 4 are views showing connection states where the arm having the single hook is coupled to the multi-adaptor assembly for a vehicle wiper according to the first example of the present invention.
Figure 3:
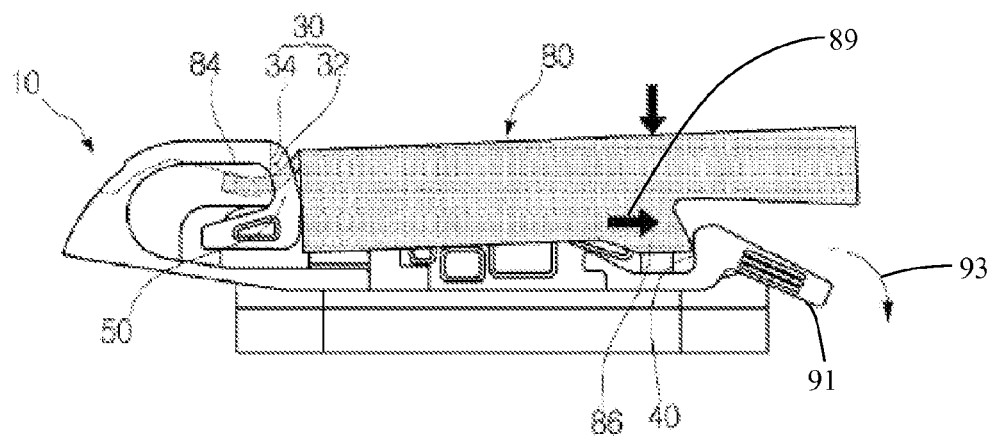
Figure 4:
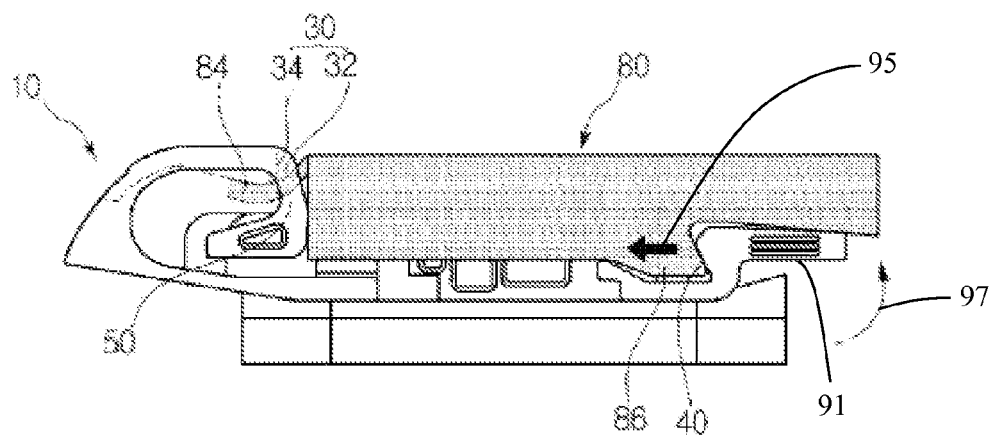

FIGS. 2 to 4 are views showing connection states where the arm having the single hook is coupled to the multi-adaptor assembly for a vehicle wiper according to the first example of the present invention.

Referring to FIGS. 2 to 4, detailed description will be given of a process of coupling of the arm (80) having the single hook. As illustrated in FIG. 2, the arm (80) is placed so as to cover upper portion of the adaptor (10), and then the hook (84) of the arm (80) is inserted in the insertion groove (32) of the hook-coupling portion (30).

Next, as illustrated in FIG. 3, the stopper pieces (86) of the arm (80) are fittingly coupled to the support portions (40), wherein, firstly, after downwardly elastically deforming the support portions (40) by pressing the upper portion thereof to displace the support portions (40) in a backward direction as indicated by arrow (89), the stopper pieces (86) of the arm (80) are fitted and a release tab (91) is rotated in a clockwise direction as indicated by arrow (93), and then, as illustrated in FIG. 4, if the support portions (40) are restored from its elastic deformation to thereby support the stopper pieces (86) of the arm (80) the release tab (91) rotates counter-clockwise, as indicated by arrow (97), and the support portions (40) move in a forward direction as indicated by arrow (95). The hook (84) of the arm (80) is supported on the support projection (34) of the hook-coupling portion (30) in close contact therewith by means of the elastic force of the support portions (40), and at the same time the free end portion (82) of the arm (80) is also supported on the snap hooks (50) in close contact therewith.

With such a process, the hook (84) of the arm (80) is supported on the hook-coupling portion (30) of the adaptor (10) in close contact therewith and the stopper pieces (86) of the arm is supported on the support portions (40) of the adaptor in close contact therewith, thus the one end portion and the other end portion of the arm (80) are simultaneously secured to the adaptor (10), whereby arm-coupling force can be drastically increased as compared to the conventional adaptor.

As described above, the multi-adaptor for a vehicle wiper according to the first example of the present invention couples the arm having the hook to the main body of the adaptor by using the hook-coupling portion and snap hooks as coupling portions and through its support portions provides the arm with the elastic force such that the hook of the arm can be supported inside the hook-coupling portion in close contact therewith, whereby the arm-coupling force can be drastically increased as compared to the conventional adaptor, and thus the arm can be preemptively prevented from being separated from the adaptor.

Figure 5:
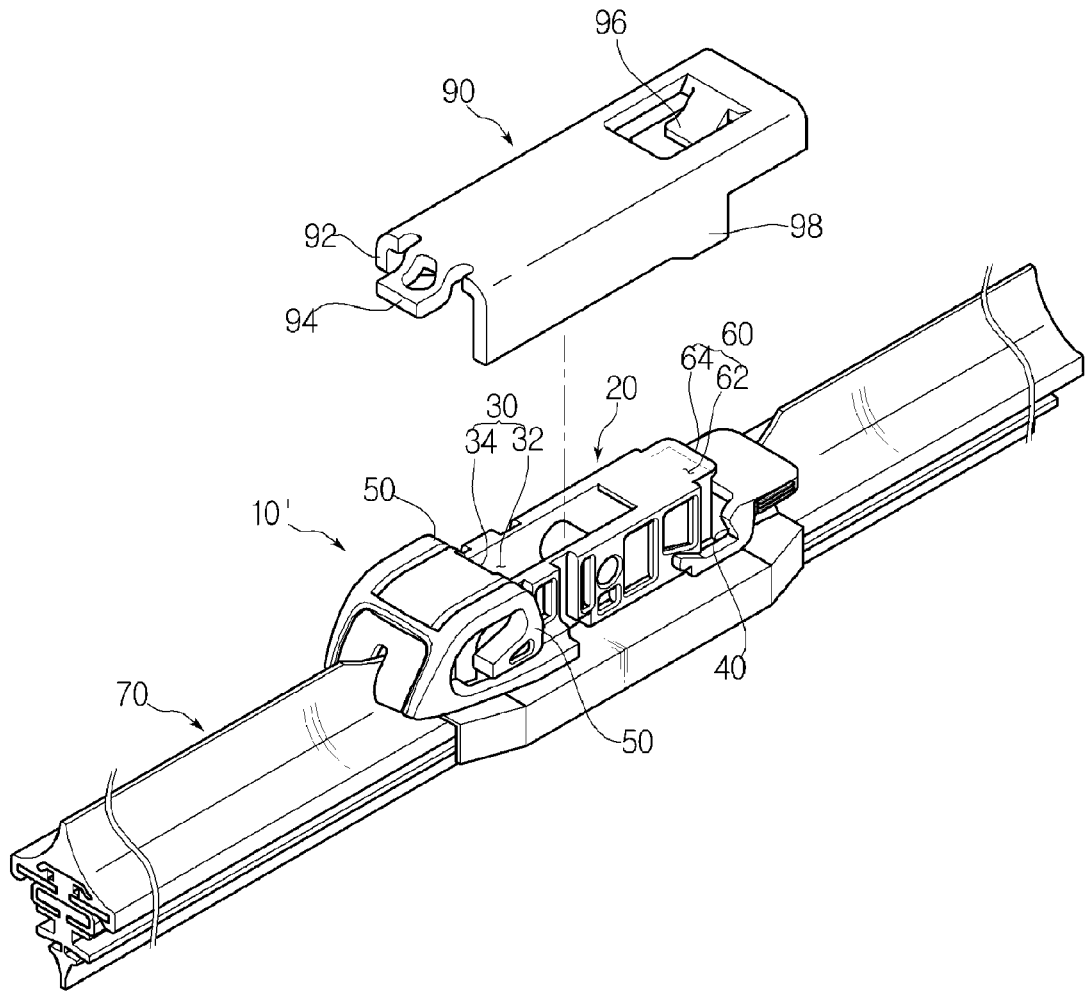
FIG. 5 is an exploded perspective view showing a state where an arm having a plurality of hooks is coupled to a multi-adaptor for a vehicle wiper according to a second example of the present invention.

FIG. 5 is an exploded perspective view showing a state where an arm having a plurality of hooks is coupled to a multi-adaptor for a vehicle wiper according to a second example of the present invention.

Referring to FIG. 5, the arm (90) having the plurality of hooks is provided with a hook (94) protruding from a free end portion (92) and an auxiliary hook (96) positioned with a distance from the hook (94), and a pair of stopper pieces (98) are formed at both side walls of the arm (90) while downwardly protruding therefrom, respectively.

The adaptor (10') according to the second example coupled with the arm (90) having the plurality of hooks (94, 96) has the same construction as that of the adaptor of the first example, but further comprises an auxiliary hook-coupling portion (60) arranged in the main body (20) and coupled with the auxiliary hook (96) of the arm (90).

Namely, the main body (20) of the adaptor (10') has the hook-coupling portion (30) and auxiliary hook-coupling portion (60) coupled with the hook (94) and auxiliary hook (96) of the arm (90), respectively and the support portions (40) for elastically supporting the stopper pieces (98) of the arm (90).

Here, the auxiliary hook-coupling portion (60) is arranged at the other end portion of the main body and hook-coupled with the auxiliary hook (96) of the arm (90). Such an auxiliary hook-coupling portion (60) consists of an auxiliary insertion groove (62) in which the auxiliary hook (96) of the arm (90) is inserted, and an auxiliary support projection (64) for supporting a tip of the auxiliary hook (96) inserted through the auxiliary insertion groove (62).

The support portions (40) elastically support the stopper pieces (98) of the arm (90), and provide the arm (90) with the elastic force such that the hook (94) of the arm (90) can be supported on the support projection (34) of the hook-coupling portion (30) in close contact therewith and the auxiliary hook (96) of the arm (90) can be supported on the auxiliary support projection (64) of the auxiliary hook-coupling portion (60) in close contact therewith.

If the snap hooks (50) are additionally arranged at one end portion of the main body (20) as coupling portions coupled with the free end portion (92) of the arm (90), the arm (90) can be more firmly secured to the adaptor (10).

In addition, since the adaptor (10') according to the second example can be coupled with the arm (80) having a single hook by using the hook-coupling portion (30) and the support portions (40), the arm (80) having the single hook and arm (90) having the plurality of hooks are simultaneously compatible with the adaptor.

Figure 6:
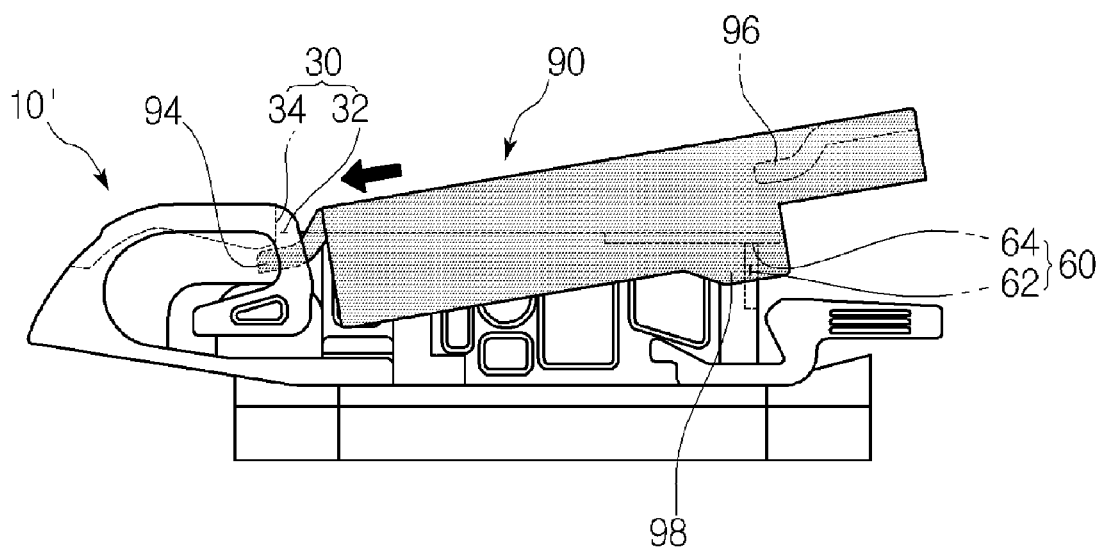
FIGS. 6 to 8 are views showing connection states where the arm having the plurality of hooks is coupled to the multi-adaptor for a vehicle wiper according to the second example of the present invention.
Figure 7:
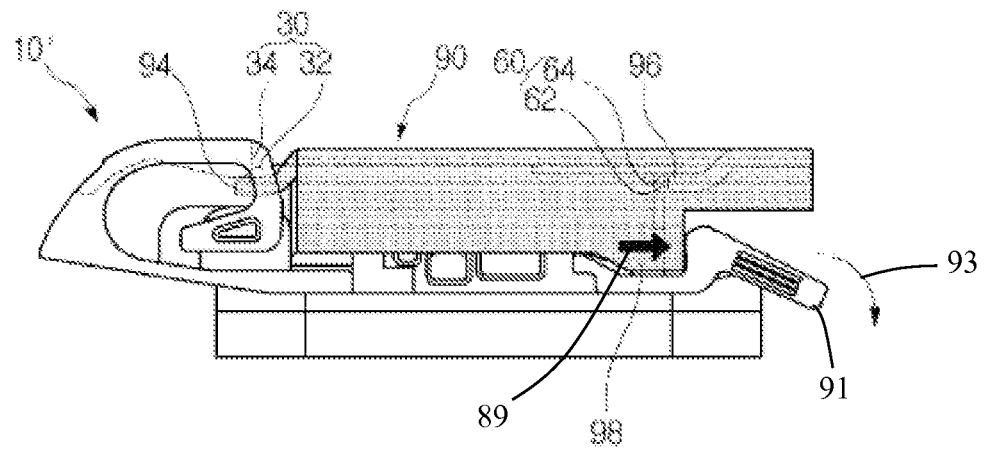
Figure 8:
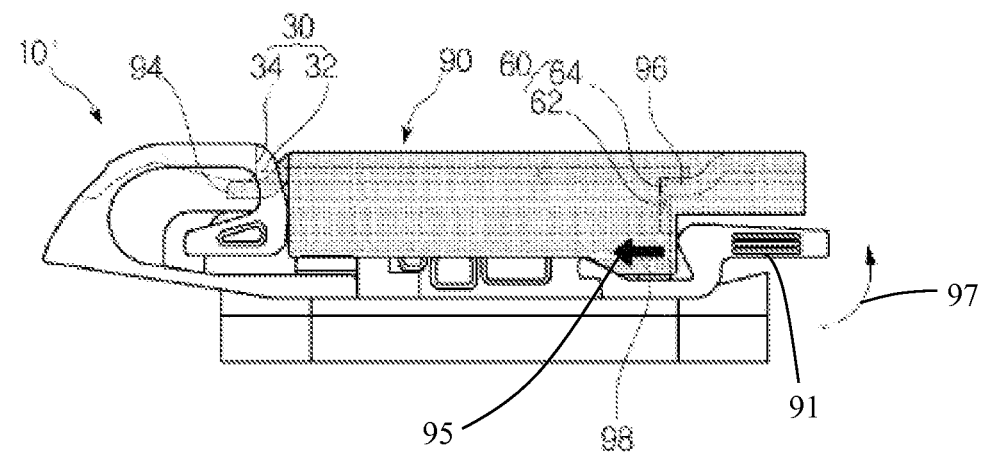

FIGS. 6 to 8 are views showing connection states where the arm having the plurality of hooks is coupled to the multi-adaptor for a vehicle wiper according to the second example of the present invention.

Referring to FIGS. 6 to 8, detailed description will be given of a process of coupling of the arm (90) having the plurality of hooks. As illustrated in FIG. 6, the arm (90) is placed so as to cover upper portion of the adaptor (10'), and then the hook (94) of the arm (90) is inserted in the insertion groove (32) of the hook-coupling portion (30), and at the same time, as illustrated in FIG. 7, the auxiliary hook (96) of the arm (90) is also inserted in the auxiliary insertion groove (62) of the auxiliary hook-coupling portion (60).

The auxiliary hook (96) of the arm (90) is inserted in the auxiliary hook-coupling portion (60) and at the same time the stopper pieces (98) of the arm (90) are fittingly coupled to the support portions (40), wherein, firstly, after downwardly elastically deforming the support portions (40) by pressing the upper portion thereof to displace the support portions (40) in a backward direction as indicated by arrow (89), the stopper pieces (98) of the arm (90) are fitted to the support portions (40) and a release tab (91) is rotated in a clockwise direction as indicated by arrow (93), and then, as illustrated in FIG. 8, if the support portions (40) are restored from its elastic deformation to thereby support the stopper pieces (98) of the arm (90) the release tab (91) rotates counter-clockwise, as indicated by arrow (97), and the support portions (40) move in a forward direction, as indicated by arrow (95). The hook (94) of the arm (90) is supported on the support projection (34) of the hook-coupling portion (30) in close contact therewith by means of the elastic force of the support portions (40), and the auxiliary hook (96) of the arm (90) is also supported on the auxiliary support projection (64) of the auxiliary hook-coupling portion (60) in close contact therewith, and at the same time the free end portion (92) of the arm (90) is also supported on the snap hooks (50) in close contact therewith.

With such a process, the hook (94), auxiliary hook (96) and stopper pieces (98) of the arm (90) are supported on the hook-coupling portion (30), auxiliary hook-coupling portion (60) and support portions (40) of the adaptor (10') in close contact therewith, respectively, and thus the one end portion and the other end portion of the arm (90) are simultaneously secured to the adaptor (10'), whereby the arm-coupling force can be drastically increased as compared to the conventional adaptor.

Figure 9:
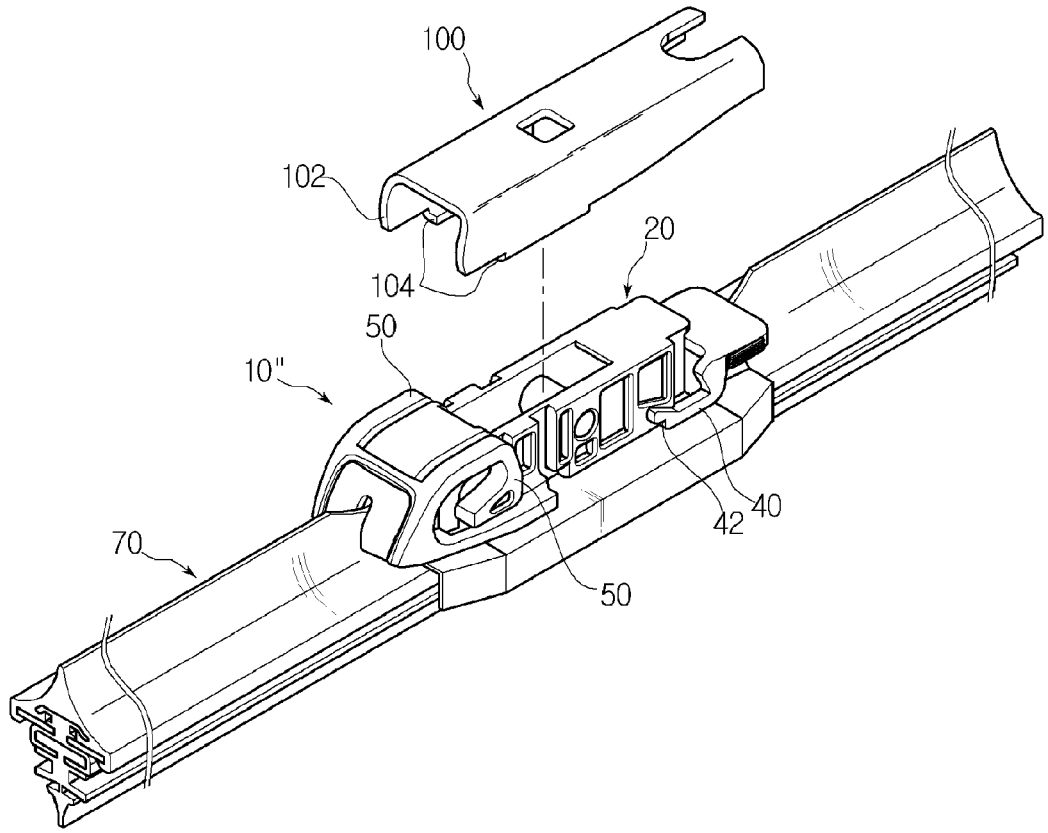
FIG. 9 is a perspective view showing construction of a multi-adaptor for a vehicle wiper according to a third example of the present invention and an arm of top lock type.

FIG. 9 is a perspective view showing construction of a multi-adaptor for a vehicle wiper according to a third example of the present invention and an arm of top lock type.

As illustrated in FIG. 9, the multi-adaptor (10") for a vehicle wiper according to the third example of the present invention comprises a main body (20), a coupling portion arranged at one end portion of the main body (20), to which coupling portion a free end portion (102) of the arm (100) is coupled, and support portions (40) arranged at both side walls of the main body (20) to support stopper pieces (104) of the arm (100).

Here, the arm (100) coupled with the multi-adaptor (10") for a vehicle wiper has a protruding free end portion (102), and a pair of stopper pieces (104) are arranged at both side walls of the arm (100), respectively while downwardly protruding and extending bent inward.

In the following, description will be given of each construction of the multi-adaptor (10") for a vehicle wiper to which the arm (100) is coupled.

The main body (20) is in the form of case and coupled to a blade (70) for wiping surface of glass window of the vehicle.

The multi-adaptor (10") according to the third example of the present invention comprises snap hooks (50) as coupling portions, to which the free end portion (102) of the arm (100) is coupled.

The snap hooks (50) are arranged at one end portion of the main body (20) to elastically support the free end portion (102) of the arm (100), and provide the arm (100) with the elastic force such that the stopper pieces (104) of the arm (100) can be supported on the support portions (40) arranged at the other end portion of the main body (20) in close contact therewith.

Namely, the snap hooks (50) are arranged at both side walls of the one end portion of the main body (20) so as to each have elasticity, and when the free end portion (102) of the arm (100) is supported on the snap hooks in close contact therewith, the hooks are elastically deformed toward a side opposite the free end portion (102) of the arm (100), and when the stopper pieces (104) of the arm (100) are supported on the support portions (40) arranged at both side walls of the other end portion of the main body (20), the elastically deformed snap hooks (50) are restored to thereby provide the arm (100) with the elastic force such that the stopper pieces (104) of the arm (100) can be supported on the support portions (40) in close contact therewith.

The support portions (40) are arranged at the other end portion of the main body (20) and protrude from both side walls of the other end portion of the main body (20) toward the snap hooks (50), and support the stopper pieces (104) of the arm (100) such that the free end portion (102) of the arm (100) can be elastically supported on the snap hooks (50).

In addition, arranged at tips of the support portions (40) are stopper projections (42) by which the stopper pieces (104) of the arm (100) are kept caught.

Namely, since the stopper pieces (104) of the arm (100) protrude downwardly from both side walls of the arm (100) and each extend bent inward, if the stopper projections (42) are formed at the tips of the support portions (40) such that the stopper pieces (104) of the arm (100) can be supported on the support portions (40) and at the same time kept caught thereby, the stopper pieces (104) of the arm (100) are kept caught by the stopper projections (42) of the support portions (40), whereby the arm (100) can be firmly secured to the adaptor (10") for a vehicle wiper without being separated therefrom.

Figure 10:
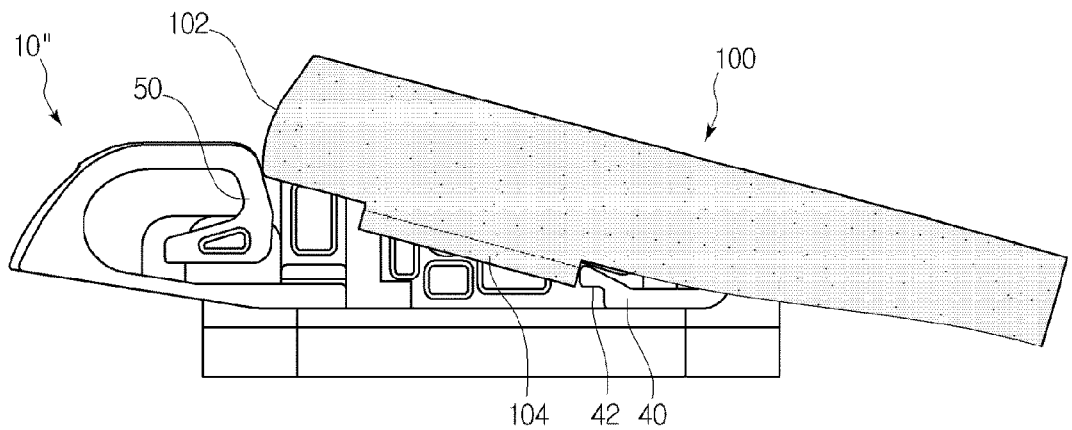
FIGS. 10 to 12 are views showing connection states where the arm of top lock type is coupled to the multi-adaptor for a vehicle wiper according to the third example of the present invention.
Figure 11:
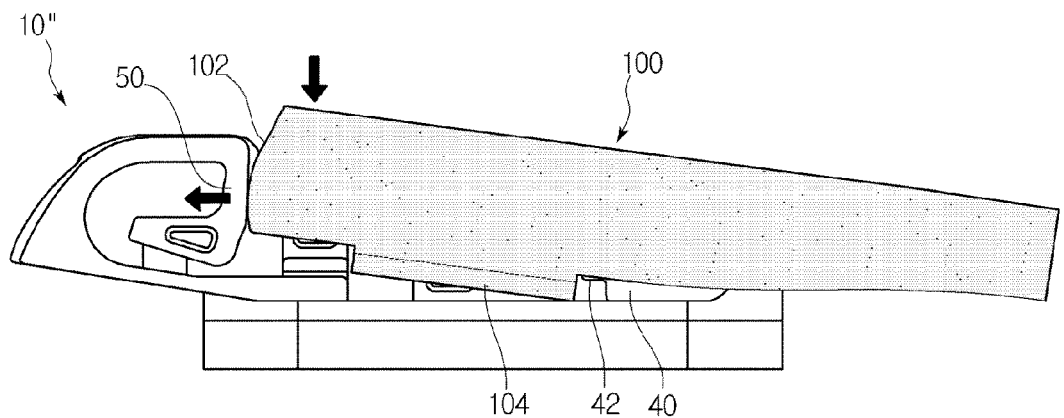
Figure 12:
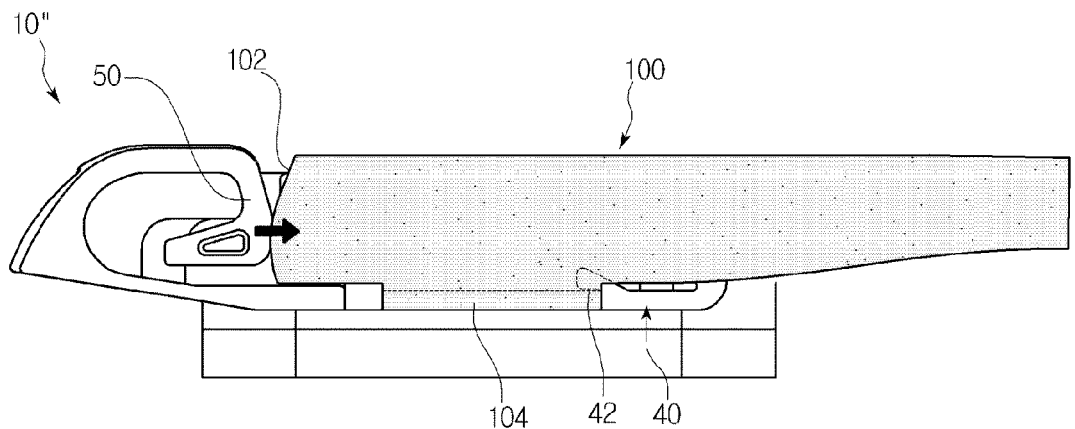

FIGS. 10 to 12 are views showing connection states where the arm of top lock type is coupled to the multi-adaptor for a vehicle wiper according to the present invention.

Referring to FIGS. 10 to 12, detailed description will be given of a process of coupling of the arm (100) of top lock type to the multi-adaptor (100) for a vehicle wiper, wherein, as illustrated in FIG. 10, if the arm (100) is placed so as to cover the upper portion of the adaptor (10") with the stopper pieces (104) of the arm (100) abutting against the stopper projections (42) of the support portions (40), the upper portions of the snap hooks (50) are pressed by the protruding free end portion (102) of the arm (100).

As illustrated in FIG. 11, the snap hooks (50) are elastically deformed while being pressed by the free end portion (102) of the arm (100) wherein, as illustrated in FIG. 12, if the stopper pieces (104) of the arm (100) are fitted to the stopper projections (42) of the support portions (40), the snap hooks (50) are restored from its elastic deformation to provide the elastic force such that the stopper pieces (104) of the arm (100) can be supported on the stopper projections (42) of the support portions (40) in close contact therewith, whereby the stopper pieces (104) of the arm (100) are kept caught by the stopper projections (42) of the support portions (40), thus the arm (100) is firmly secured without departing from the adaptor (10").

With such a process, the free end portion (102) and stopper pieces (104) of the arm (100) are supported on the snap hooks (50) and stopper projections (42) of the support portions (40) of the adaptor (10") in close contact therewith, respectively, and thus the one end portion and the other end portion of the arm (100) are simultaneously secured to the adaptor (10"), whereby the arm-coupling force can be drastically increased as compared to the conventional adaptor.

As described above, the multi-adaptor for a vehicle wiper according to the third example of the present invention has wide portions coupled with the arm of top lock type by utilizing the snap hooks and support portions, thereby can drastically increase the arm-coupling force as compared to the conventional adaptor, and thus can preemptively prevent the arm from being separated from the adaptor.

The present invention may be variously substituted or modified without departing from the technical concept of the present invention by persons having ordinary skills of the technical field to which the present invention belongs, and therefore, is not limited to the above-described examples and the attached drawings.

What is claimed is:

1. An adaptor for a vehicle wiper, the adaptor connecting a blade and an arm to each other, the adaptor comprising:
    a main body having a first end and a second end;
    a pair of pressure-supporters formed at the first end of the main body at both sides thereof, to be in a press-contact with and elastically support a first end of the arm, wherein each of the pressure-supporters includes a bending extension from a first end of the main body, and a space is formed between the first end of the main body and each bending extension; and
    a pair of holding protrusions formed at the second end of the main body at both sides thereof to be in contact with and hold a pair of first stoppers of the arm, the pair of first stoppers of the arm extending horizontally and inwardly from lower ends of sidewalls of the arm.

2. A vehicle wiper, comprising:
    a blade;
    an arm, wherein the arm comprises:
        a top portion having a first top portion side and a second top portion side;

a first downward wall extending from the first top portion side and a second downward wall extending from the second top portion side; and a first stopper extending horizontally and inwardly from lower ends of the first wall and a second stopper extending horizontally and inwardly from lower ends of the second wall; and an adaptor to connect the blade and arm to each other, wherein the adaptor comprises a main body with a first main body side and a second main body side; a first holding protrusion on the first main body side and second holding protrusion on the second main body side to be in contact with and hold the first and second stoppers of the arm; the main body further having a first end with first end sides of the main body, and a second end of the main body; a first pressure supporter and a second pressure-supporter extending from the first end sides, and wherein the first pressure supporter and second pressure-supporters are in a press-contact with, and elastically support, the first wall and the second wall of the arm.

3. The vehicle wiper of claim 2, wherein the first pressure supporter has a first bending extension and the second pressure-supporters has a second bending extension, and a first space and a second space are formed between the first end of the main body and the first bending extension and between the first end of the main body and the second bending extension.

4. The vehicle wiper of claim 3, wherein the first pressure supporter include a first protrusion extending horizontally from the first bending extension toward the first end of the main body and the second pressure-supporter includes a second protrusion extending horizontally from the second bending extension toward the first end of the main body.

* * * * *